United States Patent [19]

Jayapalan

[11] Patent Number: 5,533,019

[45] Date of Patent: Jul. 2, 1996

[54] PACKET DATA IN AN ANALOG CELLULAR RADIOTELEPHONE SYSTEM

[75] Inventor: Jay P. Jayapalan, Buffalo Grove, Ill.

[73] Assignee: Motorola, Inc., Schaumburg, Ill.

[21] Appl. No.: 189,522

[22] Filed: Jan. 31, 1994

[51] Int. Cl.[6] .............................. H04Q 11/04; H04B 7/26
[52] U.S. Cl. ...................... 370/60.1; 370/94.2; 370/95.1; 379/60; 455/33.1; 455/54.1
[58] Field of Search .................................. 370/58.1, 58.2, 370/58.3, 60, 60.1, 94.1, 94.2, 95.1, 95.3; 379/57, 58, 59, 60, 63; 455/33.1, 33.2, 34.1, 34.2, 54.1, 54.2, 56.1, 53.1; 375/219, 220, 222, 303, 305, 324, 334, 336

[56] References Cited

U.S. PATENT DOCUMENTS

| | | | |
|---|---|---|---|
| Re. 34,034 | 8/1992 | O'Sullivan | 379/59 |
| 4,654,867 | 3/1987 | Labedz et al. | 379/59 |
| 4,707,826 | 11/1987 | Froggatt | 370/60 |
| 4,718,062 | 1/1988 | Andersen | 370/60 |
| 4,731,785 | 3/1988 | Ferenc et al. | 370/60 |
| 4,821,259 | 4/1989 | DeBruler et al. | 370/60 |
| 4,837,800 | 6/1989 | Freeburg et al. | 379/59 |
| 4,887,265 | 12/1989 | Felix | 370/94.1 |
| 5,093,827 | 3/1992 | Franklin et al. | 370/60.1 |
| 5,142,534 | 8/1992 | Simpson et al. | 370/95.1 |
| 5,195,090 | 3/1993 | Bolliger et al. | 379/59 |

OTHER PUBLICATIONS

R. Frank Quick, Jr., "An Overview of the Cellular Digital Packet Data (CDPD) System", Pacific Communication Sciences, Inc., pp. 338–343.

Roger L. Freeman, "Telecommunication System Engineering", A Wiley–Interscience Publication, pp. 483–484.

*Primary Examiner*—Alpus H. Hsu
*Attorney, Agent, or Firm*—Jeffrey G. Toler

[57] ABSTRACT

A method and apparatus for circuit-switched and single-user traffic channel packet data communication in a cellular radiotelephone system, including a base station and mobile data unit both operable for establishing either a circuit-switched data call connection or a single-user connectionless packet data traffic channel via a radio channel, and communicating packet data over the established radio channel.

22 Claims, 4 Drawing Sheets

FIG. 1

—PRIOR ART—

PACKET DATA IN AN ANALOG CELLULAR RADIOTELEPHONE SYSTEM

BACKGROUND OF THE INVENTION

The present invention is generally related to cellular telephone systems, and more particularly to an improved analog cellular telephone system capable of transmitting packet data.

Although the primary focus of cellular radiotelephone service has been on providing voice communications, there has been a rapid growth in demand for data services. Also, because cellular telephone systems provide performance characteristics of the land line telephone system and interconnect with it, subscribers expect land telephone features from the cellular telephone system. Thus, early solutions to demand for data have included use of a conventional modem to convert data to voiceband frequencies before transmitting the data from the subscriber unit (SU) over the cellular air interface, much like data is converted to voiceband frequencies before it is sent over land lines. However, the bandwidth provided for voice in analog cellular is 300 to 3000 Hz, which is narrower than that for land lines. Further, FM techniques such as companding and preemphasis modify a data signal in ways that modems built for land lines do not have to contend with, and problems arising from rapid multipath fading and handoffs further complicate cellular data transmission. The use of land line modems has thus proven unreliable except under favorable radio conditions.

As a result, refinements have been made, such as use of a specialized modem with error correction techniques suitable for a cellular channel, or use of an intermediate radio channel format for transmission over the air interface to a voice transceiver at a base station (BS), from where the data is reconverted and transmitted via a conventional modem to a public switched telephone network (PSTN). An example of this latter system may be found in U.S. Pat. No. 4,654, 867, Labedz et al., assigned to the assignee of the present invention. However, these approaches have a limited bandwidth, and a need remains for cellular data systems that can deliver still greater data rates with high reliability to handle the increasing demand for data services over cellular channels.

More recently, packet-switching techniques, similar to those used in computer communications, have been developed for application in cellular radiotelephone environments. Unlike the earlier circuit-switched systems, these systems format the user data into data packets and rely on packet-switching to route the data packets to the end system (ES) data processor. One such approach is Cellular Digital Packet Data (CDPD), which is generally described in the CDPD System Specification Release 1.0 (Jul. 19, 1993); an early example of such may be found in U.S. Pat. No. 4,887,265, Felix, assigned to the assignee of the present invention. In these systems the channel is occupied by a user only for the duration of each packet transmission, rather than leaving the channel connection in place until a user disconnect. The main advantage of a CDPD system is channel conservation, allowing multiple users to send and receive short, bursty packet transmissions over the same channel, thus minimizing the number of channels needed for data services. CDPD may be implemented either using a dedicated radio channel (such as disclosed in the above U.S. Pat. No. 4,887,265), or by "borrowing" unused portions of a voice channel. In either case, all such prior art packet data systems have relied upon packet-switching for routing the packet data to the ES-data processor from the SU. But, although CDPD does achieve some channel conservation, it also limits the bandwidth available for the transmission of the user data. Such a limited bandwidth may not adversely affect smaller or slower applications such as E-Mail retrieval, but it is a problem when longer applications, such as file transfers or facsimile transmissions, are needed.

Finally, digital cellular systems have been proposed for providing the needed increase in bandwidth for data transmission, particularly those that are being designed to interface with ISDN like GSM (or Global System for Mobile communications). However, in countries like the U.S. digital cellular systems will most likely be phased-in so that current analog systems like AMPS (Advanced Mobile Phone Service) may continue to support existing subscribers for some time to come. There thus remains a need for a method and device for reliable and faster data transmission over analog cellular systems.

SUMMARY OF THE INVENTION

The present invention provides a unique solution to these and further problems, by providing a packet data communication system for an analog cellular radiotelephone system in which the packet data may be communicated over a circuit-switched channel. In one embodiment the system includes a base station having voice and data transceivers, the data transceivers being capable of transceiving packet data capable. A base site controller is operable to establish a circuit-switched packet-data call connection between a mobile data unit and a data end system via the base station.

In another embodiment, the system and method includes a mobile data unit having data call circuitry operable for requesting and establishing a circuit-switched data connection or a single-user hybrid data channel for packet data transfer with a data end system via a base station, and packet-data circuitry for communicating packet data via the circuit-switched data connection or hybrid data channel.

These and yet other embodiments are described below and set forth in the claims.

DETAILED DESCRIPTION OF A PREFERRED EMBODIMENT

Figure 1:
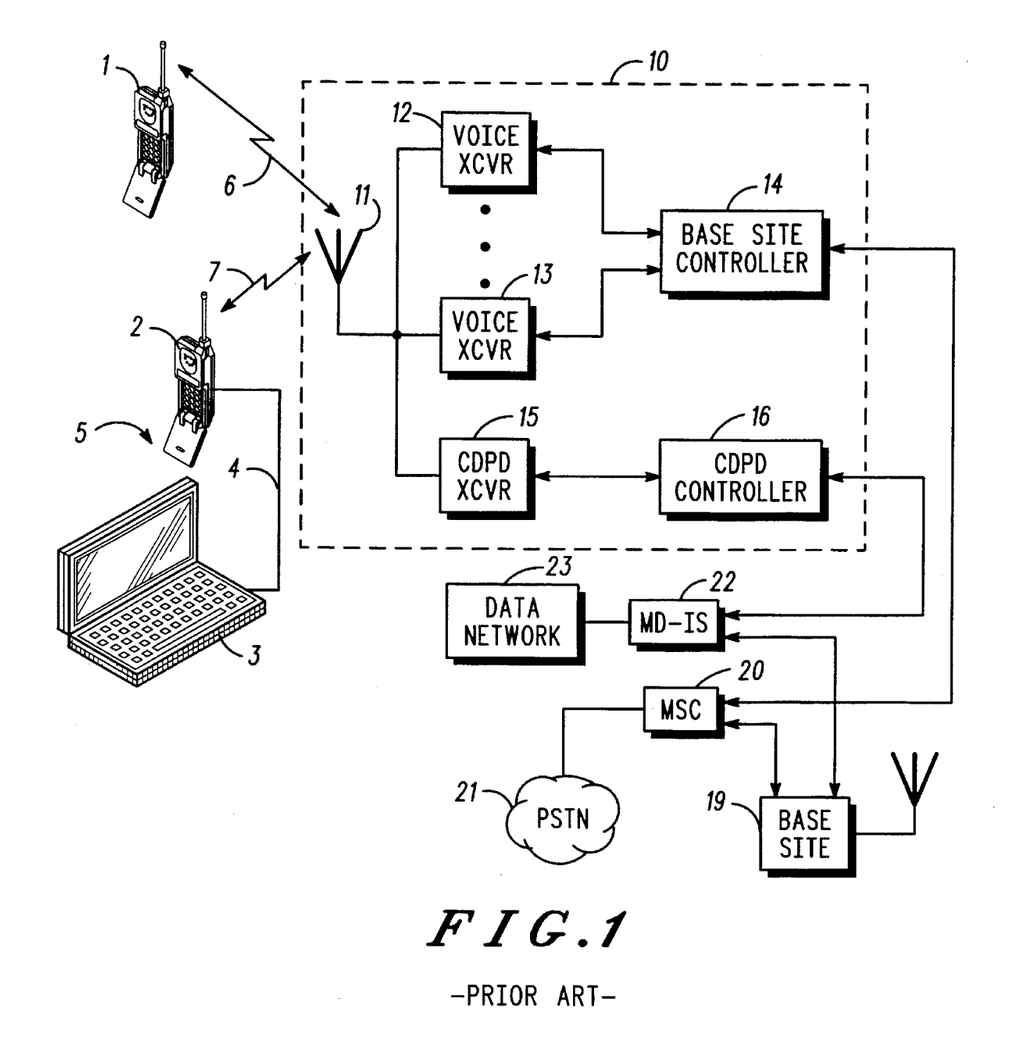
FIG. 1 is a block diagram of a prior art packet-switched cellular radiotelephone system.

Beginning with FIG. 1, a block diagram of a representative packet-switched cellular radiotelephone system is shown such as is proposed for use in providing CDPD data services. This packet-switched cellular system includes subscriber units (SUs) 1 and 2 capable of communication with base station (BS) 10. SUs 1 and 2 are mobile cellular radiotelephones capable of analog (e.g., FDMA or frequency division multiple access) voice transmission. SU 2 is connected to a mobile data terminal 3, such as a laptop computer (which includes a processor(μp8), via an interface 4, such as a DTE to DCE (data terminal to data circuit terminating equipment) RS 232 interface. SU 2, mobile data terminal 3 and interface 4 together form a mobile data system (MDS) 5.

BS 10 includes an antenna 11 connected to voice transceivers 12, 13 and CDPD transceiver 15. Voice transceivers 12, 13 are in turn connected with base site controller (BSC) 14, and together form the analog voice circuitry of BS 10 for sending and receiving cellular voice transmissions (such as radio signal 6 from SU 1). This analog voice circuitry may be any well known AMPS base station, including older base sites of the type described in U.S. Pat. Nos. 4,485,486, 4,707,734 and 4,726,050. SU 2 may be any well known data-capable cellular radiotelephone, such as the commercially available "MICROTAC" with data interface manufactured and sold by Motorola, Inc., which includes a processor (μp 9) and a modulator 17. A general description of the AMPS system is provided in "The Bell System Technical Journal," 1979, Vol. 58, No. 1, pp 1–269.

CDPD transceiver 15 is connected to CDPD controller 16, which together form the data circuitry of BS 10 for sending and receiving CDPD packet data transmissions (such as radio signal 7 from MS 5). While the data circuitry of BS 10 has been illustrated as part of BS 10, this CDPD base station equipment may also form a stand-alone facility co-located with the AMPS base station. In either case, this data circuitry and related protocols may be implemented in accordance with the CDPD System Specification (Release 1.0, Jul. 19, 1993), which is available from the CDPD Industry Input Coordinator, 650 Town Center Drive, Suite 820, Costa Mesa, Calif. 92626 U.S.A. Since radio signal 7 has been GMSK (Gaussian minimum shift key) modulated, SU 2 is adaptable for use in both analog voice (i.e., using FM and FSK modulation) and CDPD data communication modes.

Once a CDPD data packet has been processed by the CDPD controller 16, controller 16 communicates the CDPD data packet to data network 23 via mobile data-intermediate system (MD-IS) 22. Similarly, the base site controller 14 communicates voice messages to PSTN 21 via mobile switching center (MSC) 20. One or more further base stations 19 may also communicate voice and data messages via MD-IS 22 and MSC 20, respectively.

The system of FIG. 1 illustrates a system for CDPD packet data communications in an analog cellular (e.g. AMPS) environment. Common to all prior art CDPD systems is their reliance upon packet-switching for the transmission and routing of the data packets. While CDPD packet-switching does provide a means for an efficient utilization of channel capacity when shorter packet transmissions are being sent, it is disadvantageous for longer transmissions due to delays arising from other user data packets contending for and occupying transmission time, and from the lower throughput caused by the CDPD packet-switching specific protocols.

Figure 2:
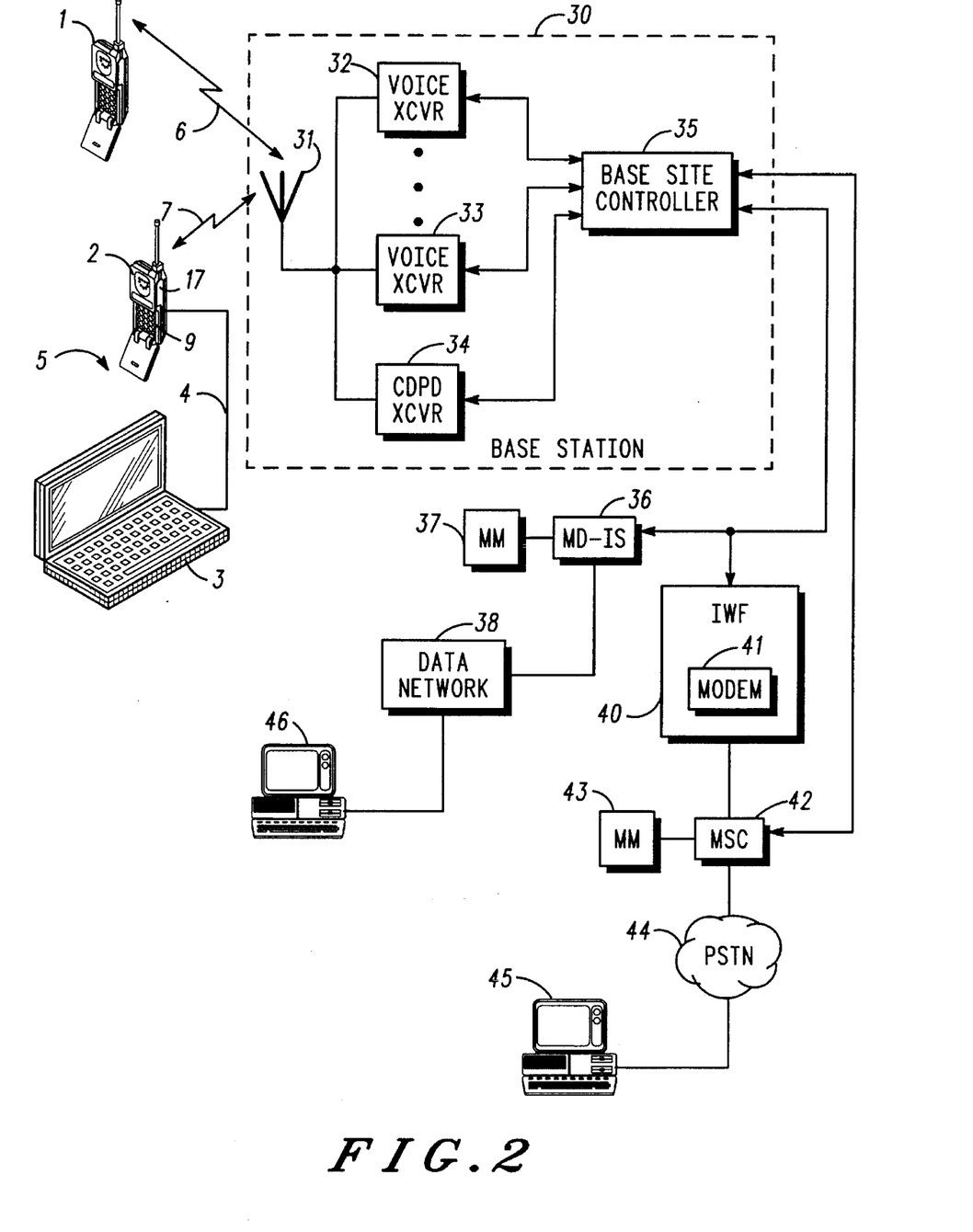
FIG. 2 is a block diagram of a combined packet-switched, circuit-switched, and single-user channel connection analog cellular radiotelephone system according to the present invention.

Referring now to FIG. 2, a presently preferred embodiment is shown of an improved cellular radiotelephone system for data transmission, which provides for significant increases in user data throughput over the packet-switched systems noted above. Subscriber unit (SU) 1 sends and receives FM voice radio signals 6 from one of the voice transceivers 32, 33 of base station (BS) 30. As in the system of FIG. 1, the base site controller (BSC) 35 is operable to control voice transceivers 32, 33 and to send and receive voice messages to PSTN 44 via a mobile switching center (MSC) 44. BSC 35 is additionally operable, however, to control one or more CDPD transceivers 34 to send and receive packet data transmissions 6 from mobile data system (MDS) 5. MDS 5 includes a mobile data terminal 3 and SU 2 with a processor (like μp of FIG. 1) adapted to format user data into data packets for circuit-switched, packet-switched or a hybrid single-user data channel transmission, or to unformat received data packets.

When a data transfer is set up, MDS 5 determines whether the transfer is to be packet-switched, circuit-switched or via a hybrid data channel. If a circuit-switched data connection is to be set up, MDS 5 negotiates with BSC 35 for assignment of a traffic channel for communication with CDPD transceiver 34. If the transfer is to be CDPD packet-switched, MDS 5 will search for a forward channel having a datastream, and register and commence packet transmission upon receipt of appropriate idle bits. BSC 35 determines channel assignment, including e.g., whether CDPD transceiver 34 is assigned for use with a dedicated or non-dedicated channel. Finally, if a hybrid data channel is desired, MDS 5 again negotiates with BSC 35 for assignment of a traffic channel for communication with CDPD transceiver 34. Unlike a circuit-switched data connection, however, a hybrid data channel does not establish a circuit between MDS 5 and the end user since connectionless protocols are preferably used. One skilled in the art will recognize that more than one channel or transceiver may be assigned to handle data transmissions, and, as long as multiple data-capable transceivers are installed, the system may be designed to flexibly assign one or more data channels, whether circuit-packet-switched or hybrid, dedicated or non-dedicated, etc. depending on factors such as the demand for voice and data channels, and the relative priority given to voice and data traffic.

When a data call is established, the processor (not shown) of BSC 35 operates to appropriately route data packets received from MDS 5. Thus, when a circuit-switched data connection has been established, BSC 35 routes the received data packets along the established circuit link to PSTN 44 via inter working function (IWF) 40 and MSC 42, and ultimately to the end system 45 connected to the PSTN 44. On the other hand, if a packet-switched transfer is being made, the data packet will be routed to the data network 38 via MD-IS 36 as in the CDPD system of FIG. 1. When a hybrid data channel is established, a channel is assigned by BSC 35 for the sole use of communication of data packets between MDS 5 to MD-IS 36, for transmission onto data network 38 to the addressed end system 46. Thus, a hybrid data channel is similar to a circuit-switched connection in that a single-user channel is assigned between MDS 5 and the MSC 42 or MD-IS 36. However, unlike a circuit-switched connection the data packets are transferred using connectionless protocols (e.g., TCP/IP), thus facilitating packetized transfer across the data network 38. BSC 35 may also support data connections via one of the voice transceivers 32, 33, thus allowing subscriber units that do not have packet data capabilities to still send and receive data across the voice networks (i.e., PSTN 44).

As an additional feature of the instant invention, MDS 5 may be designed to select a packet-switched data service if it is operating in the service area of a base station such as BS 10 of FIG. 1. Thus, when a subscriber finds itself in a service area that does not support circuit-switched packet data service, MDS 5 still operates to establish packet data service, albeit a slower packet-switched one. Further, MDS 5 may also include either a voice-band modem or processor adapted to format the data for transmission to a voice transceiver at the base station, if no packet data service is supported by the base station. Thus, a versatile mobile data system 5 is provided capable of establishing a data connection even in coverage areas that have not yet upgraded to a packet data service capability.

Figure 3:
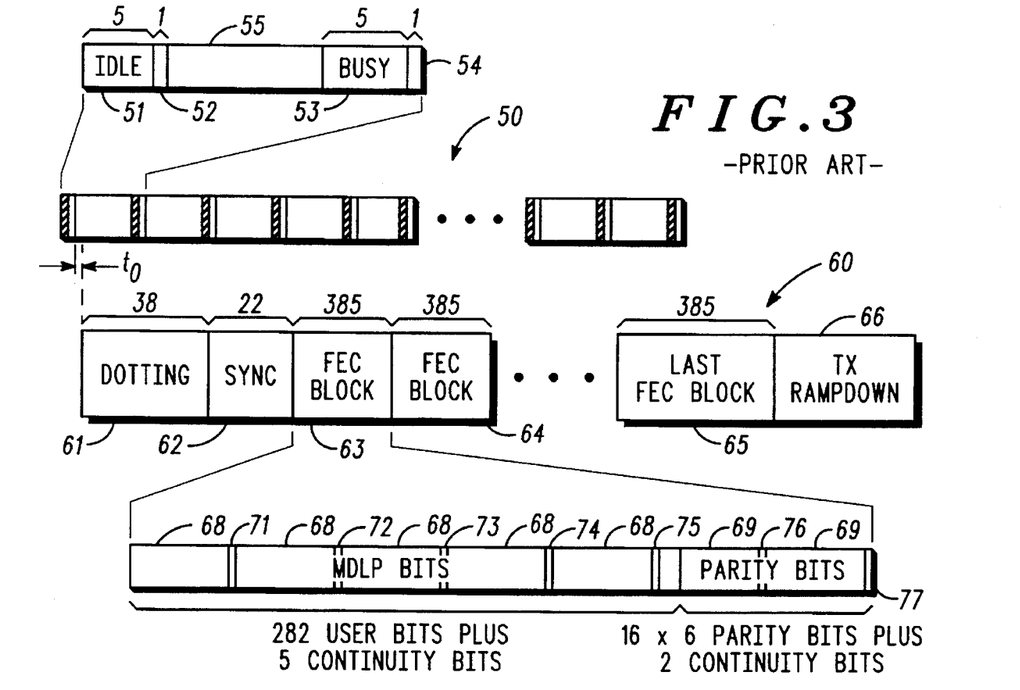
FIG. 3 illustrates a structure that may be used for data communicated on radio channels of a packet-switched cellular radiotelephone system like that shown in FIG. 1.
Figure 4:
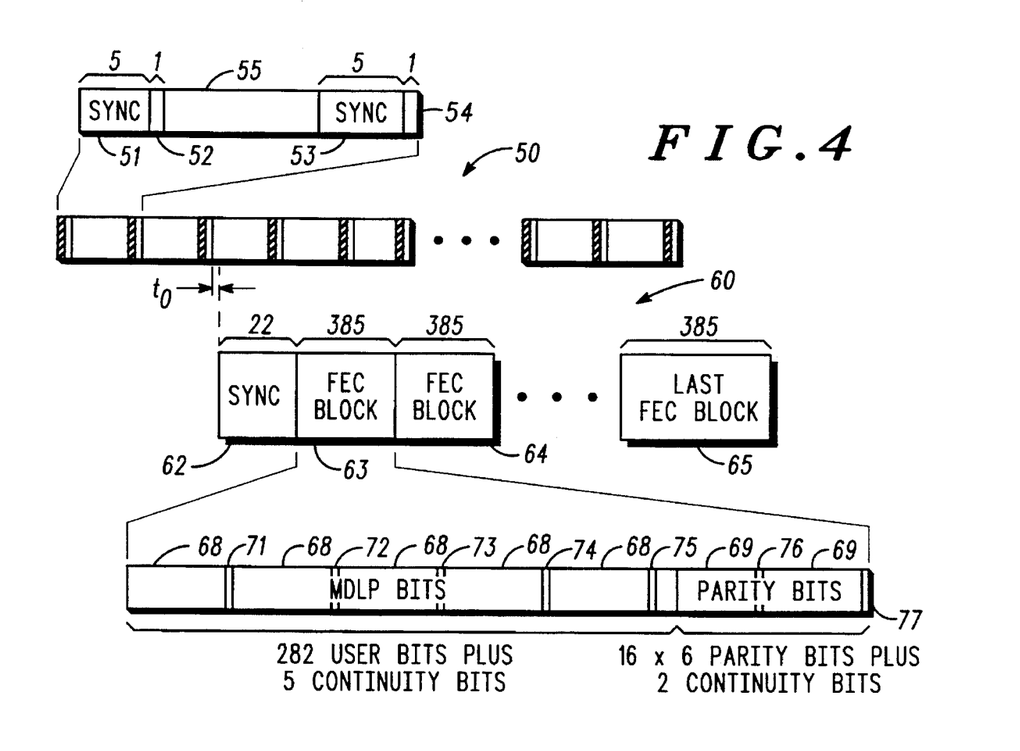
FIG. 4 illustrates a structure for packet data that may be communicated on radio channels of the cellular radiotelephone system of FIG. 2.

FIGS. 3 and 4 further illustrate the operation of the invention by showing the structure of the data being transmitted over the reverse and forward radio channels, with FIG. 3 showing a datastream structure that may be used in packet-switched transmissions and FIG. 4 showing a datastream structure that may be used in circuit-switched service. In order to minimize the number of different processing steps required for circuit-switched versus packet-switched packet data service, a preferred embodiment of the circuit-switched datastream shown in FIG. 4 is structured so as to use most of the same elements as a packet-switched datastream (shown in FIG. 3). The common elements are designated with the same numbers in both FIGS. 3 and 4. The packet-switched datastream is also preferably structured so as to meet the CDPD specification, thus permitting interoperability among SUs and cell sites supporting CDPD.

The forward channel datastream 50 is the datastream transmitted from the base station (BS) 10 to the mobile data system (MDS) 5. During packet-switched operation, the BS 10 transmits a series of control flags to inform mobile data systems in the service area of the status of the reverse channel. Thus, in FIG. 3 the first control flag includes five idle bits 51, which inform mobile data system 5 that the reverse channel is idle and available for data transmissions, and a decode status bit 52. In response to the idle bits, the MDS 5 has period of time $t_0$ (e.g., six bits or less) in which to start transmission of a sequence of dotting bits 61 on the reverse channel. If a timely dotting sequence 61 is received, the BS 10 changes the control flag on the forward channel to transmit busy bits 53 instead of idle bits 51. Decode status bits 52, 54 serve to notify the MDS 5 whether or not a data block has been successfully decoded and error corrected by the BS 10. In addition to providing status information, the control flags also serve as sync signals and are thus transmitted with a set spacing 55 (e.g., 54 bits). When user data is being transmitted in the forward channel, it is transmitted between the control flags within this spacing 55.

For CDPD packet-switching (FIG. 3), each reverse channel datastream burst 60 includes a dotting sequence 61, sync bits 62, a series of FEC (forward error correcting) blocks 63–65, and a transmission rampdown 66. Each FEC block contains user data formatted into MDLP (mobile data link protocol) frames 68 that are Reed Solomon (63,47) encoded (using 16 6-bit RS symbols 69), with seven continuity bits 71–77 uniformly inserted into the FEC block. One skilled in the art will know how to process the user data so as to segment, format and frame the user data into the desired MDLP frames.

By contrast, when sending a circuit-switched datastream, there is no longer a need for either the dotting sequence 61 at the beginning of each packet, or of the lengthy transmission rampdown 66 after each packet transmission. Rather than being limited to 64 FEC blocks per datastream burst, which a mobile data system is for CDPD packet burst transmission, as many FEC blocks of data as the MDS 5 determines desirable may be transmitted in a continuous datastream. The only additional overhead necessary for such a continuous transmission would be periodic insertion of additional sync bits 62. In the forward channel 50 a sync flag 51, 53 is used, which is preferably set as a busy flag in order to keep CDPD packet-switching MDSs that have scanned the traffic channel from attempting to send data over the reverse channel.

One skilled in the art will appreciate that further overhead may be saved if different layer protocols, encoding, sync schemes and the like are used, but in the preferred embodiment compatibility is maintained with the CDPD specifications, except for omitted sequences such as the dotting sequence 61 and TX rampdown 66. While this may limit the savings in overhead that might otherwise be available in sending circuit-switched packets, it does minimize the complexity of the subscriber unit and base station transceivers and facilitate the interoperability of combined-capability and packet-switched-only mobile data systems and base stations. Further, any such savings in overhead will be much less than the major gain in efficiency realized by the mobile data system using an uninterrupted channel in a circuit-switched packet service. Rather than contending with multiple mobile data systems for time on the same reverse channel, not to mention the delays caused if a channel hop is required, a continuous packet data datastream transmission is now possible. Thus, there is no need for DSMA/CD (digital sense multiple access protocol with collision detection) or other contention/collision, channel hopping, transmission ramp-up/ramp-down (for each burst), etc. schemes, and the overall throughput achieved by the individual mobile data system may be increased to 19.2 Kbps (the GMSK modulation data rate). With appropriate data compression techniques, one should be able to realize a net user data throughput of 36 Kbps or more (i.e., (19.2 Kbps - 6 Kbps overhead) * 2.5 compression ratio) for many applications. This is significantly more than may be realized by any of the prior art approaches.

Figure 5:
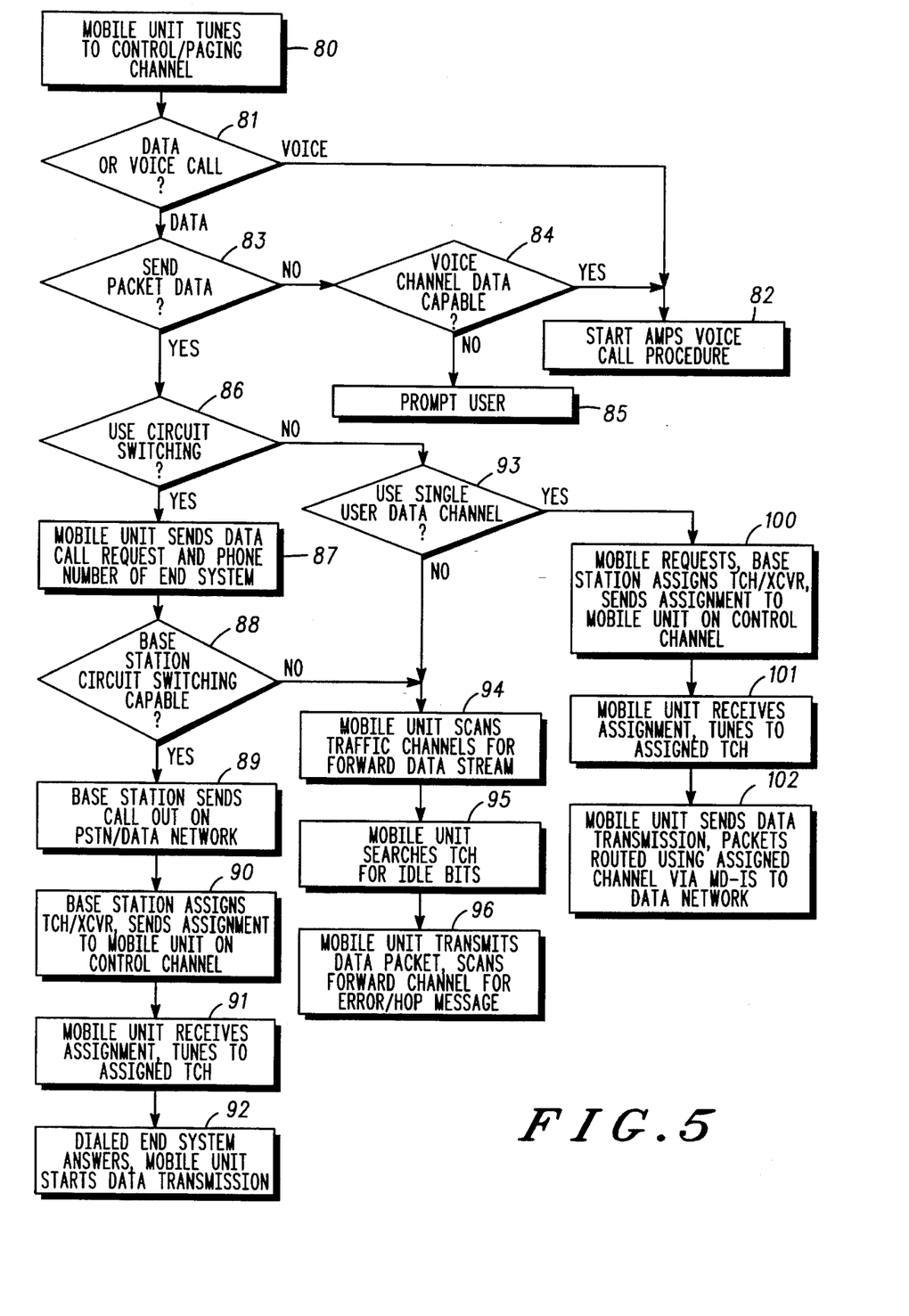
FIG. 5 is a flow chart for the process used by the mobile data system 5 and base station 10 of FIG. 2 for establishing a data call and transfer.

FIG. 5 shows a flow chart of a method by which a data transfer may be set up by mobile data system (MDS) 5. When MDS 5 first determines that a call is wanted, such as in response to user input or independent input from a data processor, the MDS 5 will scan and tune its transceiver to the control/paging channel of BS 10. MDS 5 also determines whether a user data (i.e., data from the data processor 3) transfer or an analog voice call is being sent (step 81). If an analog voice call has been requested by the user, the subscriber unit 1 of MDS 5 commences its standard AMPS voice call procedure.

If, on the other hand, MDS 5 determines that a user data transfer has been requested, it makes further determinations of whether packet data and circuit-switching service is desired (steps 83, 86). If it is determined that a circuit-switched packet data service is desired, MDS 5 sends a data call request, which may simply include the phone number of the end system that is to receive the data and some additional extension (e.g., *DATA or *FAX), to the BS 10. Alternatively, an extended protocol procedure within the AMPS control channel may be utilized for requesting and establishing the circuit-switched data call. If BS 10 is set up for circuit-switching of packet data calls, it will send the data call out on the PSTN. The base station will then assign a traffic channel (TCH) and transceiver to handle the data call, and send the assignment to MDS 5 on the control channel. Upon receipt of the assignment MDS 5 tunes to the TCH, and upon receiving an answer or notification that the end system has answered, MDS 5 commences transmission of its packet data (steps 87–92). While transmitting the data, substantially the same protocols and equipment as proposed for CDPD may be used. Thus, for example, substantially the same sub network dependent convergence (SNDCP) and mobile data link (MDLP) protocols may be used in processing network layer user data in MDS 5 to appropriately segment, frame and ARQ format the data, along with the same error correction encoding (FEC) and modulation (GMSK) to prepare the data for transmission across the air interface. Likewise, the modulation and FEC encoding may be terminated at the base station 10. The ARQ error detection, frame extraction and data packet binding may also be similarly processed, with e.g. IWF 40 terminating MDLP framing.

Alternatively, where the end user is connected to a data network so that a connectionless data transfer is preferable, but a high data transfer rate is desired, a hybrid single-user data channel may be requested. In this case, the MDS 5 again requests and is assigned a traffic channel by the BS 10 for the sole use of data transfer to and from MDS 5. This traffic channel provides a connection between MDS 5 and MD-IS 36, which connection allows uninterrupted transfer of data along the channel at rates much higher than would otherwise be possible for packet data transfer. The MDLP layers are similarly terminated at or before MD-IS 36, and the reconstructed data packets (including connectionless protocols) are then transmitted across the data network 38 to end user 46 (steps 93, 100–102).

When packet-switching service is desired, or when MDS 5 is operating in a service area in which a base station is not set up for circuit-switching packet data service, MDS 5 will begin scanning the forward traffic channels for a datastream (e.g., the forward channel sync word). Upon finding such a datastream, MDS 5 will wait for an idle flag, and then register and commence CDPD packet transmission (steps 94–96).

In addition to providing flexibility in the way in which data is communicated, the invention may also be used in combined voice and data communications. Thus, for example, a subscriber could begin by initiating a conventional circuit-switched voice call with another user. The BS 10 would be monitoring the TCH for a switch-to-data command signal from the MDS 5, which signal could be initiated by an appropriate set of keystrokes at MDS 5 by the user. Upon receipt of the command signal, BS 10 will cause a CDPD transceiver and appropriate IWF functions to be switched into the channel. The end user 45 will already have been alerted to switch to data mode (by voice communication). Data communications may then commence. While exchanging data the users may again communicate that they would like to switch back to voice mode. On receiving a switch-to-voice command signal from MDS 5, the BS 10 will cause a voice transceiver to be deployed and the IWF functions disabled. This process can be even further simplified if a single transceiver having both voice and CDPD capabilities is assigned.

If the base station is not set up to receive packet data transmissions, MDS 5 may still attempt to send data over a voice channel, e.g., by voiceband modem or via the intermediate radio channel formatting of U.S. Pat. No. 4,654, 867. In this case, MDS 5 will again commence standard AMPS voice call procedure, possibly inserting an appropriate identifier alerting the base station that a data transmission is being requested.

When a data call connection is being set up from BS 10 to MDS 5, initiated for example by a data end user 45 via PSTN 44, a circuit-switched connection is set up using similar negotiation procedures via the paging/control channels as are used for establishing AMPS voice connections. At present MDS 5 preferably has separate cellular numbers for data and voice services, and the particular data capability of MDS 5 is known from the mobility management (MM) entity's 43 home location register (HLR) or visitor location register (VLR). Thus, BSC 35 will know that MDS 5 is packet-data capable, and MDS 5 will know from the cellular number that a circuit-switched packet data call connection is being requested. One skilled in the art will recognize, however, that circuit-switched packet data service may be initiated by a variety of different procedures, and that the preferability of any given procedure will be affected by the procedures adopted and supported by the various cellular service providers.

Finally, while MDS 5 is communicating a data call, it is also sending and receiving control information for handoffs and other radio resource management purposes. Such communications can be governed by, e.g., the existing EIA/TIA-553 protocol. However, these messages would be sent within MDLP using a different logical channel and by the use of unnumbered information frames. A CDPD transceiver will receive and separate the EIA/TIA-553 messages and send them to the appropriate software process responsible for radio resource management.

While a particular embodiment of the system and methods according to the invention has been shown and described, it should be understood that the invention is not limited thereto since many modifications may be made. Further, while the above embodiment has been described in terms of a particular implementation for the AMPS analog cellular system, one skilled in the art may appreciate how the invention may be implemented in any analog cellular system, including JTACS and ETACS. It is therefore contemplated that the present invention covers any and all such modifications that fall within the spirit and scope of the basic underlying principles disclosed and claimed herein.

We claim:

1. An analog cellular radiotelephone system for communicating analog voice messages via radio channels to and from one or more mobile voice units, and additionally communicating user data via one or more of the radio channels, the system comprising:

a mobile data unit operable for communicating user data via said one or more radio channels; and a base station comprising:
   one or more voice transceiver means for transmitting and receiving analog voice communications to and from said one or more mobile voice units;
   a data transceiver means for transmitting and receiving a plurality of digital data packets to and from said mobile data unit; and
   a base site controller comprising a means for establishing a packet data circuit-switched connection between the mobile data unit and a data end system, a means for establishing a packet-switched data transfer channel between the mobile data unit and the data end system, and means for determining when to establish the packet data circuit-switched connection and when to establish the packet-switched data transfer channel.

2. The system of claim 1, wherein the means for establishing a packet-switched data transfer channel is operable to establish said data transfer channel using Cellular Digital Packet Data (CDPD) protocols.

3. The system of claim 1, wherein the mobile data unit comprises:

a data processor operable for processing user data into a plurality of data packets; and subscriber unit means for converting said plurality of data packets into a bitstream of error encoded data blocks and modulating said bitstream for transmission over said one or more radio channels.

4. The system of claim 3, wherein the subscriber unit means comprises a processor operable for converting said plurality of data packets into a bitstream series of forward error correction (FEC), Reed Solomon encoded data blocks, and a modulator operable for modulating said bitstream into a gaussian minimum shift key (GMSK) modulated signal.

5. The system of claim 4, wherein the modulator is further operable for modulating the bitstream at a 19.2 Kbps rate.

6. The system of claim 3, wherein the data transceiver means is further operable for demodulating and error correcting a modulated bit stream transmitted from the mobile data unit into an error corrected plurality of data frames.

7. The system of claim 6, further comprising an inter working function means connected to the base station for detecting errors in said plurality of data frames and reconverting said plurality of data frames into said plurality of data packets.

8. The system of claim 1, wherein the base site controller further comprises means for establishing a further circuit-switched call connection via said one or more voice transceiver means, and said one or more voice transceiver means are operable for transmitting and receiving voiceband modulated data communications to and from the mobile data unit.

9. The system of claim 1, wherein the base site controller further comprises means for switching between the packet data circuit-switched call connection using the data transceiver means and a voice call connection using one of the voice transceiver means in response to a request from one of the mobile data unit and the data end system.

10. An analog cellular radiotelephone system for communicating analog voice messages via radio channels to and from one or more mobile voice units, and additionally communicating user data via one or more of the radio channels to and from a mobile data unit, the system comprising:

a base station comprising:
one or more voice transceivers for transmitting and receiving analog voice communications to and from said one or more mobile voice units;
a data transceiver for transmitting and receiving a plurality of digital data packets to and from said mobile data unit; and
a base site controller comprising a means for establishing a single-user hybrid data channel over one of the radio channels between the mobile data unit and a data end system, to communicate said user data to and from the mobile unit.

11. The system of claim 10, wherein the base site controller further comprises:
means for establishing a packet-switched data transfer channel between the mobile data unit and the data end system; and
means for determining when to establish the single-user hybrid data channel and when to establish a packet-switched data transfer channel.

12. The system of claim 10, wherein the base site controller further comprises means for establishing a circuit-switched call connection via said one or more voice transceiver means, and said one or more voice transceiver means are operable for transmitting and receiving voice band modulated data communications to and from a further mobile data unit.

13. A mobile unit for sending and receiving user data via one or more radio channels in an analog voice cellular radiotelephone system, the mobile unit comprising:
a data processor operable to output a plurality of data packets;
means for establishing a data call connection between the data processor and a data end system via said one or more radio channels, including means for establishing a packet data circuit-switched connection to the data end system, means for establishing a packet-switched data transfer channel to the data end system via the one or more radio channels, and means for determining when to establish the packet data circuit-switched connection and when to establish the packet-switched data transfer channel.

14. The mobile unit of claim 13, further comprising a means for converting said plurality of data packets into a bitstream of error encoded data blocks and modulating said bitstream for transmission over said one or more radio channels.

15. The mobile unit of claim 13, wherein the means for converting comprises a processor operable for converting said plurality of data packets into a bitstream series of forward error correction (FEC), Reed Solomon encoded data blocks, and a modulator operable for modulating said bitstream into a gaussian minimum shift key (GMSK) modulated signal.

16. The mobile unit of claim 15, wherein the modulator is further operable for modulating the bitstream at a 19.2 Kbps rate.

17. The mobile unit of claim 13, wherein the means for converting and modulating is operable, when a packet-switched data transfer channel is established, to convert said plurality of data packets using Cellular Digital Packet Data (CDPD) protocols.

18. The mobile unit of claim 13, wherein said means for establishing a data call connection further comprises a means for establishing a further circuit-switched data call connection via a voice transceiver of said base station.

19. An analog cellular radiotelephone system for communicating analog voice messages and user data via radio channels to and from one or more mobile units, the system comprising:
a mobile data unit;
a base station operable for communicating user data via a radio channel with the mobile data unit, comprising a packet data transceiver operable for communicating packet data with the mobile data unit, and a base site controller operable for establishing a single-user hybrid data channel over the radio channel between the base station and the mobile data unit, to communicate said user data to and from the mobile unit.

20. A method of sending and receiving user data via radio channels in an analog cellular radiotelephone system, comprising the steps of:
establishing a single-user hybrid data channel between a mobile unit and a base station over a particular radio channel;
communicating a plurality of data packets between the mobile unit and the base station via said single-user hybrid data channel.

21. A method of sending and receiving user data via radio channels in an analog cellular radiotelephone system, comprising the steps of:

establishing a single-user hybrid data channel between a mobile unit and a data end system, the single-user hybrid data channel comprising a radio-link data call connection between the mobile unit and a base station; and communicating a plurality of data packets between the mobile unit and the data end system via said single-user hybrid data channel.

22. The method of claim 21, further comprising the steps of:

prior to establishing the single-user hybrid data channel establishing a circuit-switched voice connection between the mobile unit and data end system; and switching from the circuit-switched voice connection to the single-user hybrid data channel while maintaining the particular radio channel in response to a request from one of the mobile unit and the data end system.

* * * * *